Patented Oct. 2, 1945

2,386,044

UNITED STATES PATENT OFFICE 2,386,044

SELECTIVE EXTRACTION OF DIOLEFINS FROM HYDROCARBON MIXTURES

Egi V. Fasce, Baton Rouge, La., assignor, by mesne assignments, to Jasco, Incorporated, a corporation of Louisiana No Drawing. Application April 18, 1940,
Serial No. 330,311

1 Claim. (Cl. 260—681.5)

This invention relates to the extraction of diolefins from hydrocarbon mixtures and particularly to the separation of diolefins from mixtures of unsaturated hydrocarbons, saturated hydrobons and other normally gaseous compounds.

The separation of olefins and diolefins from saturated hydrocarbons and other compounds of the same boiling range by the use of cuprous salts such as cuprous chloride is known, but the disadvantages heretofore in using cuprous chloride solutions were that mixtures of diolefins and olefins are obtained and when acetylene is present in the gas mixtures, copper acetylide is also formed by the action of the cuprous salts with acetylene, which compound when allowed to dry is explosive.

An object of this invention is to separate diolefins substantially free of explosive compounds from a mixture of saturated and unsaturated hydrocarbon gases and other gaseous compounds.

Another object of this invention is to provide a process in which substantially pure diolefins are obtained.

These and other objects of the invention will be understood on reading the following description.

Petroleum crude oils or fractions thereof, when subjected to high temperatures, break down or crack to form hydrocarbon compounds which have less number of carbon atoms per molecule. The hydrocarbon compounds having not over 5 carbon atoms to the molecule are normally gaseous at atmospheric temperature and consist of a mixture of both saturated and unsaturated hydrocarbons and other gases. These normally gaseous fractions of hydrocarbons are fractionally distilled to segregate into hydrocarbon fractions containing substantially the same number of carbon atoms to the molecule.

According to this invention, acid solutions of cuprous salts such as cuprous chloride with one of the two lower members of the series of aliphatic acid amides, acetamide and formamide are used for the extraction of diolefins from hydrocarbon mixtures containing acetylene or its polymer or mono-substituted homologues. A gas consisting substantially of hydrocarbons containing 4 carbon atoms to the molecule and composed of 20.6% by volume of butadiene, 11.4% by volume of isobutylene, 41% by volume of normal butene and 27.02% by volume of butane is contacted with a composition consisting of 16.7% by weight of cuprous chloride, 50% formamide and 33.3% of concentrated hydrochloric acid (specific gravity 1.19). The clear cuprous chloride-formamide solution to the amount of 185 cc. was charged to an extraction tube fitted with fritted glass plate for the gas inlet. The hydrocarbon gas mixture at a feed rate of 15 liters per hour was extracted at about 50° F. for 1½ hours until saturated. Other temperatures may be used, such as 32° to 90° F., the preferred temperature being from 40° to 60° F. Higher pressures may likewise be used up to about 200 pounds per square inch or higher, and when high pressures are used, higher temperatures may also be used. The cuprous chloride-formamide compound reacted with the butadiene and deposited out the yellow cuprous chloride-butadiene complex as a solid. The flask and contents were connected to a gas recovery system and the gas liberted by heating to about 180° F. was recovered. A total of 685 cc. of gas consisting of 69.3% by volume of butadiene, 88.6% total unsaturates and 11.4% inert gas largely displaced air was obtained. This corresponds to a yield of 76.5% butadiene and 98.5% total unsaturates on an air-free basis, or the recovery of 0.32 cubic feet of butadiene per gallon of solution. Any cuprous-acetylene compounds that may be formed are decomposed in the presence of inorganic acid, in this case, hydrochloric acid.

The above data indicate that the solution composition possessed good butadiene selectivity but low absorption capacity, and high selectivity for total olefin and diolefin. Since the absorption of butadiene and olefins in cuprous chloride is partly mechanical (solution) and partly chemical (complex formation), the concentration of the electrolyte in the solution is an important factor. A second composition consisting of lower acid and formamide concentrations was prepared. A part of the water was replaced by ethylene glycol in order to improve the absorption capacity of the solution.

| | Per cent |
|---|---|
| $Cu_2Cl_2$ | 20.0 |
| Formamide | 30.0 |
| Concentrated HCl (36.0% HCl) | 22.0 |
| Ethylene glycol | 28.0 |

This solution to the amount of 82 cc. in the fritted glass plate tube was saturated at about 50° F. for 2½ hours employing a feed gas of the following composition:

| | Percent by volume |
|---|---|
| Butadiene | 17.9 |
| Isobutylene | 35.0 |
| Normal butylenes | 35.0 |
| Normal butane | 12.1 |

The gas feed rate was the same as in the previous experiment (15 liters per hour). The butadiene-cuprous chloride complex settled out as before. The saturated solution was heated to about 180° F. to recover the gas. A total of 1080 cc. of gas at 0° C. and 760 mm. pressure was recovered. The gas showed 84% butadiene and 99% total unsaturates by conversion to air-free basis. This corresponds to recoveries of 1.33 cubic feet of butadiene and 1.76 cubic feet of olefin plus diolefin per gallon of absorption solution. Thus the solution offers a marked advantage in butadiene absorption capacity and selectivity over the stronger acid solution used in the preliminary extraction.

Alternately, a solution of cuprous chloride containing acetamide may be used, for example, one containing 20% cuprous chloride, 14.2% water, 7.8% concentrated hydrochloric acid and 30% acetamide and 28% ethylene glycol. This solution was contacted with a gas containing 17.9% butadiene, 30.4% isobutylene, 39.2% butylene and 12.5% butane for one hour at a temperature of 50° F., and on heating to a temperature of 180° F., a gas was recovered composed of 86.2% of butadiene, essentially 100% of total unsaturated hydrocarbons and 13.6% of butylene. Each gallon of the solution yielded 1.67 cubic feet of butadiene.

Mixtures of formamide and acetamide may be used with cuprous chloride to recover butadiene.

Concentrated butadiene is obtained by contacting the saturated solution used in the above reactions with pure butadiene or some of the separated gases that are rich in butadiene whereby all of the butylenes are replaced and the solution on heating yields a concentrated butadiene compound. No acetylene explosive compounds are present in the solution as they are readily decomposed by the presence of the inorganic acid.

I claim:

A process for the recovery of butadiene from a gaseous mixture containing unsaturated hydrocarbons having 4 carbon atoms to the molecule which comprises contacting a mixture of saturated and unsaturated hydrocarbons having 4 carbon atoms to the molecule and containing butadiene with a solution of 20% cuprous chloride, 30% formamide, 22% concentrated HCl (36.0% HCl) and 28.0% ethylene glycol at a temperature of 32° to 90° F., separating the solution and expelling butadiene therefrom.

EGI V. FASCE.